(12) United States Patent
Danilov et al.

(10) Patent No.: US 10,496,318 B1
(45) Date of Patent: Dec. 3, 2019

(54) SYSTEM AND METHOD FOR CAPACITY MANAGEMENT IN MULTI-TIERED STORAGE

(71) Applicant: EMC IP Holding Company LLC, Hopkinton, MA (US)

(72) Inventors: Mikhail Danilov, Saint Petersburg (RU); Konstantin Buinov, Prague (CZ); Alexander Rakulenko, Seattle, WA (US); Gregory Skripko, Seattle, WA (US); Kirill Gusakov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 8 days.

(21) Appl. No.: 15/582,170

(22) Filed: Apr. 28, 2017

(51) Int. Cl.
*G06F 3/06* (2006.01)

(52) U.S. Cl.
CPC ............ *G06F 3/0647* (2013.01); *G06F 3/067* (2013.01); *G06F 3/0608* (2013.01)

(58) Field of Classification Search
CPC ............ G06F 3/00; G06F 3/06–3/0608; G06F 3/061–3/0647; G06F 3/0649–3/067; G06F 3/0671–3/0689; G06F 11/00–11/3696; G06F 12/00–12/16; G06F 13/00–13/4295; G06F 17/30–17/30997; G06F 2003/0691–2003/0698; G06F 2201/00–2201/885; G06F 2206/00–2206/20; G06F 2211/00–2211/902; G06F 2212/00–2212/7211; G06F 2213/00–2213/4004; G06F 2216/00–2216/17

See application file for complete search history.

(56) References Cited

U.S. PATENT DOCUMENTS

| 4,638,424 | A | * | 1/1987 | Beglin | G06F 12/08 |
| | | | | | 711/112 |
| 5,564,037 | A | * | 10/1996 | Lam | G06F 3/0608 |
| | | | | | 707/999.202 |
| 5,822,780 | A | * | 10/1998 | Schutzman | G06F 17/30952 |
| | | | | | 711/165 |

(Continued)

OTHER PUBLICATIONS

Constructing Storage Capacity Migration Policies for Information Lifecycle Management System; Wang at al.; IEEE 12th International Conference on High Performance Computing and Communications; 9/1-Mar. 2010 (Year: 2010).*

(Continued)

*Primary Examiner* — Daniel C. Chappell
(74) *Attorney, Agent, or Firm* — Womble Bond Dickinson (US) LLP

(57) ABSTRACT

One embodiment is related to a method for promoting or demoting data objects in a multi-tier storage system, comprising: creating one or more chunks to store data objects therein at a first tier of the multi-tier storage system, wherein data objects stored in each chunk are associated with a same lifecycle policy and an approximately same creation time; and moving one of the one or more chunks to a second tier in its entirety based on the lifecycle policy associated with the data objects stored in the moved chunk.

18 Claims, 10 Drawing Sheets

(56) References Cited

U.S. PATENT DOCUMENTS

| | | | |
|---|---|---|---|
| 6,434,560 B1* | 8/2002 | Case | G06F 7/24 707/752 |
| 7,330,536 B2* | 2/2008 | Claudatos | H04M 3/42221 370/259 |
| 7,484,038 B1* | 1/2009 | Aiello | G06F 3/0613 711/114 |
| 7,546,431 B2* | 6/2009 | Stacey | G06F 17/30067 707/999.104 |
| 8,055,724 B2* | 11/2011 | Amegadzie | G06F 17/30221 709/217 |
| 8,180,743 B2* | 5/2012 | Claudatos | G06F 17/30085 707/694 |
| 8,214,404 B2* | 7/2012 | Kazar | G06F 3/0605 707/797 |
| 8,239,584 B1* | 8/2012 | Rabe | G06F 3/0605 710/8 |
| 8,725,869 B1* | 5/2014 | Reiner | G06F 9/5072 340/4.6 |
| 8,924,359 B1* | 12/2014 | Pendharkar | G06F 3/0605 707/665 |
| 9,037,548 B1* | 5/2015 | Dolan | G06F 3/0689 707/688 |
| 9,542,125 B1* | 1/2017 | Chen | G06F 3/0679 |
| 9,965,217 B2* | 5/2018 | Gordon | G06F 3/065 |
| 2002/0161855 A1* | 10/2002 | Manczak | G06F 17/301 709/219 |
| 2005/0015384 A1* | 1/2005 | Wehrman | G06F 17/30067 |
| 2006/0004868 A1* | 1/2006 | Claudatos | G06Q 10/10 |
| 2006/0212746 A1* | 9/2006 | Amegadzie | G06F 17/30221 714/6.3 |
| 2006/0224550 A1* | 10/2006 | Gopisetty | G06F 17/30306 |
| 2009/0249005 A1* | 10/2009 | Bender | G06F 11/1435 711/162 |
| 2009/0254585 A1* | 10/2009 | Akers | G06F 17/30306 |
| 2009/0300079 A1* | 12/2009 | Shitomi | G06F 3/0605 |
| 2009/0313449 A1* | 12/2009 | Kepner | H05K 999/00 711/165 |
| 2014/0156877 A1* | 6/2014 | Tylik | G06F 3/0605 710/18 |
| 2014/0351537 A1* | 11/2014 | Chen | G06F 3/065 711/162 |

OTHER PUBLICATIONS

Virtual Machine Migration as a Fault Tolerance Technique for Embedded Real-Time Systems; Groesbrink, Stefan; IEEE Eighth International Conference on Software Security and Reliability-Companion; Jun. 30, 2014-Jul. 2, 2014 (Year: 2014).*

* cited by examiner

400A

Tier 1 410
| chunk 1 | | | chunk 2 | | | chunk 3 | |
| record 1 | bill 1 | email 1 | bill 2 | email 2 | record 2 | email 3 | bill 3 |

Tier 2 420

Tier 1 410
| chunk 1 | | | chunk 2 | | | chunk 3 | |
| garbage | bill 1 | email 1 | bill 2 | email 2 | garbage | email 3 | bill 3 |

Tier 2 420
| chunk 4 | | |
| record 1 | record 2 | record 3 |

Tier 1 410
| chunk 1 | chunk 2 | chunk 3 |
| garbage | email 1 | garbage | email 2 | garbage | email 3 | |

Tier 2 420
| chunk 4 | chunk 5 |
| record 1 | record 2 | record 3 | bill 1 | bill 2 | bill 3 |

Tier 1 410

Tier 2 420
| chunk 4 | chunk 5 | chunk 6 |
| record 1 | record 2 | record 3 | bill 1 | bill 2 | bill 3 | email 1 | email 2 | email 3 |

FIG. 4D

SYSTEM AND METHOD FOR CAPACITY MANAGEMENT IN MULTI-TIERED STORAGE

FIELD OF THE INVENTION

Embodiments of the disclosure are related to data storage, and more particularly, to a method, apparatus, and system for promoting and demoting data between tiers in a multi-tier storage system.

BACKGROUND

Cloud-based data storage solutions are becoming increasingly popular. One example is the Elastic Cloud Storage (ECS) service provided by Dell EMC. Latest trends in software architecture and development are used in these solutions to achieve outstanding scalability, availability, and serviceability.

BRIEF DESCRIPTION OF THE DRAWINGS

Embodiments of the disclosure are illustrated by way of example and not limitation in the figures of the accompanying drawings in which like references indicate similar elements.

FIGS. 4A-D are diagrams illustrating an example storage system in which lifecycle policy-based chunk allocation is not used.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure relate to a method and apparatus for promoting or demoting data between storage tiers in a multi-tier storage system on a chunk level to reduce or avoid internal chunk fragmentation caused by promotion or demotion of data objects within a chunk at different times. Reduction in internal chunk fragmentation can help improve capacity use efficiency, which can be important at higher tiers. In order to reduce the time for which data objects are stored at a higher tier than necessary due to restrictions associated with other data objects in the same chunk, chunks are allocated such that each chunk has stored therein data objects associated with approximately the same creation time and the same lifecycle policy.

In one embodiment, all disk space of a multi-tier storage system is partitioned into a set of blocks of a fixed size called chunks. The chunks size may be 128 Megabytes (MBs). All user data may be stored in these chunks and the chunks may be shared by different user data objects. One chunk may contain segments of several user objects. Chunk content may be modified in append-only mode. When a chunk becomes full enough, it may be sealed. Content of sealed chunks may be immutable.

Figure 1:
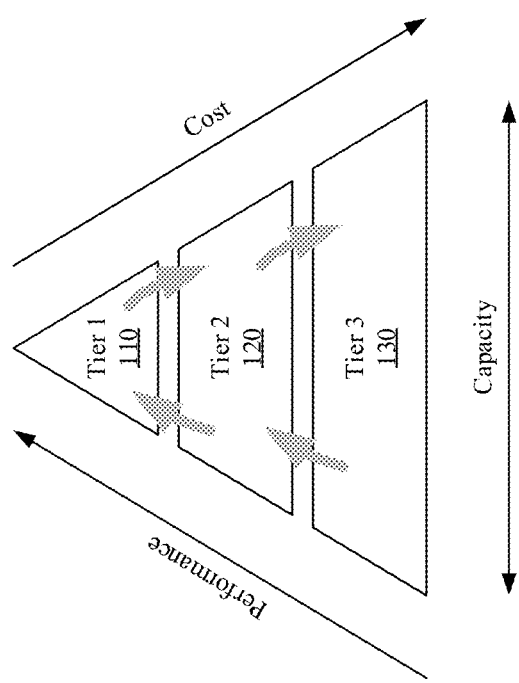
FIG. 1 is a diagram illustrating an example tiered storage system.

Referring to FIG. 1, a diagram illustrating an example tiered storage system 100 is shown. Storage tiering refers to the concept of providing a storage system consisting of several tiers, wherein the different storage tiers are implemented with different storage hardware technologies (solid-state devices, hard disk drives, tapes, etc.) For example, the tiered storage system 100 illustrated in FIG. 1 has three tiers: Tier 1 110, Tier 2 120, and Tier 3 130. Normally, a higher storage tier has better performance properties, whereas a lower storage tier has a lower Total Cost of Ownership (TCO) and more capacity.

Figure 2:
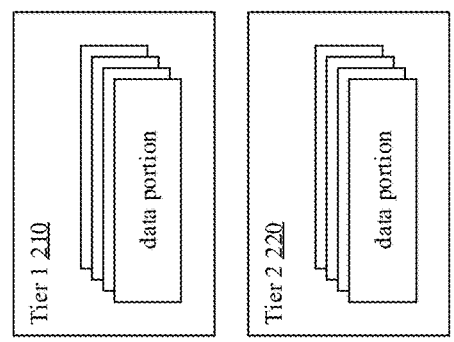
FIG. 2 is a block diagram illustrating an example tiered storage system.

Referring to FIG. 2, a block diagram illustrating an example tiered storage system 200 is shown. Two tiers: Tier 1 210 and Tier 2 220, each of which has data portions stored thereon, are illustrated in FIG. 2. Portions of user data (streams, objects, files, or blocks) may be moved between tiers to achieve the best performance/cost combination. In the case of automated storage tiering, this movement of data may take place in an automated way with the help of specific software or embedded firmware. Each tier may manage data portions it stores. For example, each of Tier 1 210 and Tier 2 220 of FIG. 2 may manage its set of data portions.

The conventional implementation of storage tiering described above may have shortcomings when used together with certain new storage capacity management techniques, such as those used in ECS. These new capacity management techniques do not rely on a file system. Rather, storage space is partitioned into a set of large blocks of a fixed size called chunks. All user data is stored in chunks.

Figure 3:
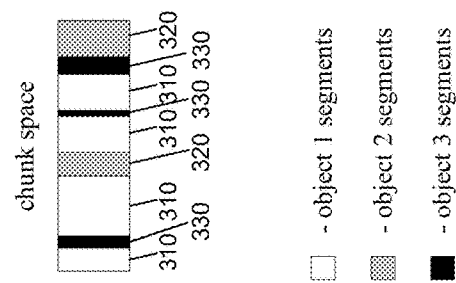
FIG. 3 is a diagram illustrating the layout of an example chunk.

Referring to FIG. 3, a diagram illustrating the layout of an example chunk 300 is shown. Chunks may be shared between user objects. In other words, one chunk may contain segments of several user objects (data portions). For example, chunk 300 of FIG. 3 contains mixed segments of three user data objects. In particular, chunk 300 contains four segments 310 for Object 1, two segments 320 for Object 2, and three segments 330 for Object 3.

The use of chunks as described above assures high write performance and capacity efficiency when a data storage system has one tier only. When a storage system is multi-tiered, user data objects may migrate between storage tiers. The inter-tier user data object migration may cause internal chunk fragmentation, which may reduce capacity efficiency.

One embodiment of the invention is related to an allocation method for a chunk-based multi-tiered storage system that may help avoid internal chunk fragmentation caused by data promotion or demotion between the tiers.

Internal chunk fragmentation may occur when data objects (portions) that share a chunk are promoted or demoted to other tiers at different moments in time that are far apart.

In one embodiment, data promotion or demotion may be performed at the chunk level. For example, the storage tier at which a chunk may be stored may be determined based on the highest storage tier at which any data portion stored in the chunk needs to be stored. This approach solves the problem of internal chunk fragmentation but may cause low efficiency of capacity use at the high tiers because some storage capacity at high tiers may be wasted on data that only need to be stored at low tiers.

A technique known as Data Lifecycle Management (DLM) is utilized in some storage systems. With DLM, data are organized into separate groups according to specified policies and are automatically promoted or demoted between storage tiers in groups based on those policies. DLM is especially useful where data lifecycle is regulated by various policies. For instance, an organization may specify the following lifecycle policies: a) Keep phone call records at storage tier 1 for 3 months and then demote them to storage tier 2; b) Keep scanned copies of paid bills at storage tier 1 for 3 years and then demote them to storage tier 2; and c) Keep emails at storage tier 1 for 6 years and then demote them to storage tier 2.

Each of these policies may be applied to a set of data objects. The storage system may schedule automatic data object demotion or promotion based on its lifecycle policy. Thus, a lifecycle policy may be used to predict objects' lifetime in a given storage tier.

In one embodiment, information about objects' expected lifetime in storage tiers may be used to allocate storage capacity, i.e. one or more chunks, to data objects with the same or similar expected lifetime. In other words, data objects stored in such a chunk may have more or less a similar creation time and the same expected life time at a particular tier. Therefore, all the data objects in the chunk may, with a high probability, have more or less a similar promotion or demotion time.

Therefore, if chunks are allocated and filled in the fashion described above, data promotion or demotion may be performed at the chunk level without compromising capacity use efficiency at high storage tiers. As data objects are promoted or demoted at the chunk level, internal chunk fragmentation may be minimized or avoided.

As described above, information about lifecycle policies associated with data objects can be used to group data objects with the same expected lifetime. When all data objects that share a chunk need to be promoted or demoted based on lifecycle policies, the entire chunk may be moved. The storage tier used to store the chunk prior to the promotion or demotion may reclaim and reuse the capacity of the chunk once the chunk has been promoted or demoted. If the storage system handles sufficient traffic, the delay between the moment when the first data object of a chunk needs to be moved and the moment when the last data object of the chunk needs to be moved may be less than a few minutes. Therefore, the impact of the delay on capacity use efficiency at high storage tiers may be negligible, especially in view of the fact that internal chunk fragmentation can be avoided.

Referring to FIGS. 4A-D, diagrams 400A-D illustrating an example storage system in which lifecycle policy-based chunk allocation is not used is shown. The example data objects may correspond to three phone call records (Record 1, Record 2, and Record 3), three scanned copies of paid bills scans (Bill 1, Bill 2, and Bill 3), and three emails (possibly with attachments) (Email 1, Email 2, and Email 3). Lifecycle policies associated with the data objects are as described above (i.e., 3 months, 3 years, and 6 years at tier 1, respectively, and then demotion to tier 2). FIG. 4A shows that the nine data objects are created at approximately the same time and are stored into three chunks in an arbitrary fashion: Record 1, Bill 1, and Email 1 in Chunk 1; Bill 2, Email 2, and Record 2 in Chunk 2; and Email 3, Record 3, and Bill 3 in Chunk 3. In other words, data objects of different types share chunks. At this point all nine data objects need to be stored at Tier 1 410; therefore, Chunk 1, Chunk 2, and Chunk 3 are stored at Tier 1 410.

FIG. 4B illustrates the storage system three months after the moment illustrated in FIG. 4A. In FIG. 4B, after the phone call records are demoted to Tier 2 420 based on the lifecycle policy, all three chunks of Tier 1 410 are in use and all three chunks have internal fragmentation. FIG. 4C illustrates the storage system three years after the moment illustrated in FIG. 4A. In FIG. 4C, after the scanned copies of paid bills are demoted to Tier 2 420 based on the lifecycle policy, all three chunks of Tier 1 410 are still in use and their capacity use efficiency is low due to internal fragmentation. FIG. 4D illustrates the storage system six years after the moment illustrated in FIG. 4A. Only in FIG. 4D, after six years and after emails are demoted to Tier 2 420 based on the lifecycle policy as well, may Tier 1 410 reclaim the capacity of Chunk 1, Chunk 2, and Chunk 3.

Figure 5A:
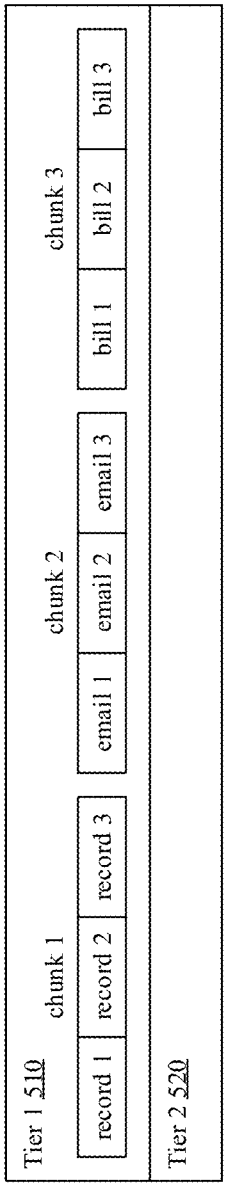
FIGS. 5A-D are diagrams illustrating an example storage system in which lifecycle policy-based chunk allocation is used.

Referring to FIGS. 5A-D, diagrams 500A-D illustrating an example storage system in which lifecycle policy-based chunk allocation is used is shown. The same data objects as illustrated in FIGS. 4A-D need to be stored. FIG. 5A shows that the nine data objects are created at approximately the same time and are stored into three chunks based on the lifecycle policies associated with the data objects, where data objects of the same type and with the same lifecycle policy are stored in a same chunk: Record 1, Record 2, and Record 3 in Chunk 1; Email 1, Email 2, and Email 3 in Chunk 2; and Bill 1, Bill 2, and Bill 3 in Chunk 3. Chunk 1, Chunk 2, and Chunk 3 are stored at Tier 1 510 because all the data objects need to be stored at Tier 1 510 at this point.

Figure 5B:
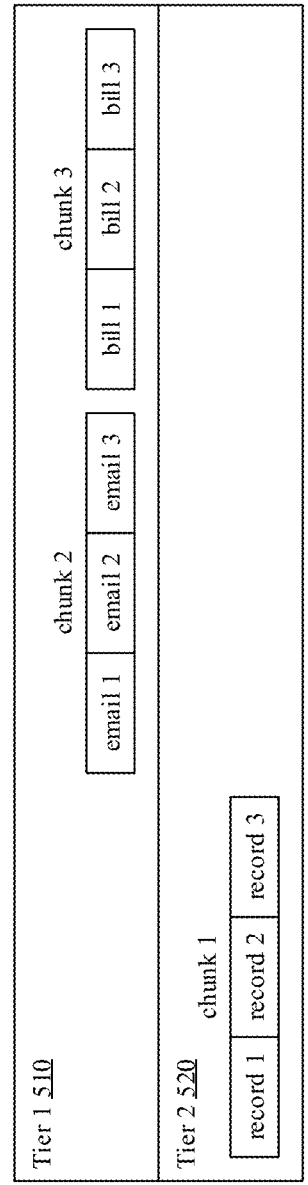
Figure 5C:
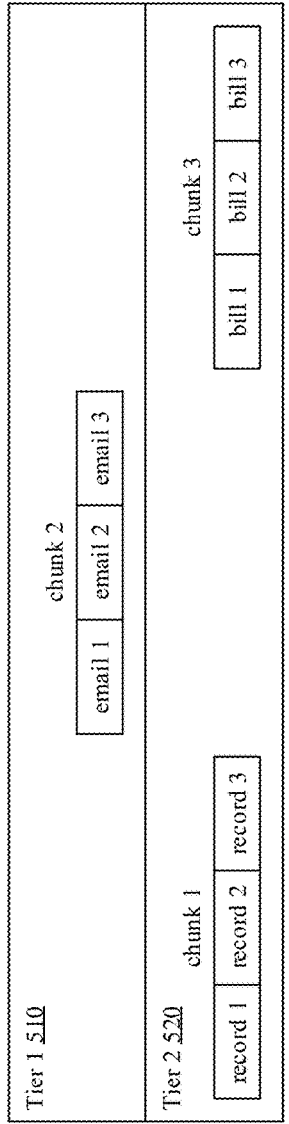
Figure 5D:
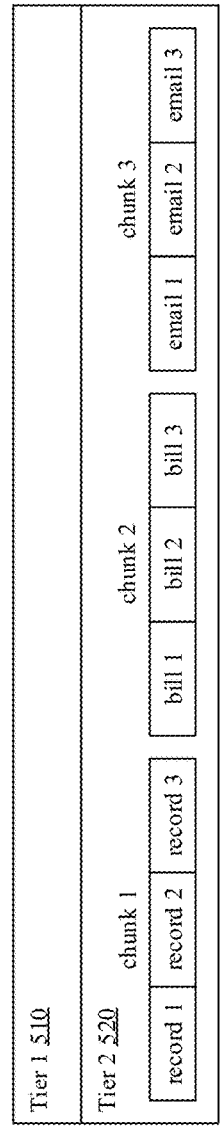

FIG. 5B illustrates the storage system three months after the moment illustrated in FIG. 5A. In FIG. 5B, Chunk 1 with the phone call records is demoted to Tier 2 520 in its entirety based on the lifecycle policy associated with phone call records. After the demotion, Tier 1 510 may reclaim the capacity that Chunk 1 used to occupy. Other chunks at Tier 1 510 (i.e., Chunk 2 and Chunk 3) still have 100% capacity use efficiency (i.e., no internal fragmentation). FIG. 5C illustrates the storage system three years after the moment illustrated in FIG. 5A. In FIG. 5C, Chunk 3 with the scanned copies of paid bills are demoted to Tier 2 520 in its entirety based on the lifecycle policy associated with scanned copies of paid bills. After the demotion, Tier 1 510 may reclaim another chunk-sized block. The only remaining chunk at Tier 1 510 (i.e., Chunk 2) still has 100% capacity use efficiency. FIG. 5D illustrates the storage system six years after the moment illustrated in FIG. 5A. In FIG. 5D, after six years, Chunk 2 with emails are demoted to Tier 2 520 as well. After the demotion, Tier 1 510 may reclaim capacity that Chunk 2 used to occupy. Therefore, by allocating chunks based on lifecycle policies associated with data objects, where each chunk is used to store data objects with the same lifecycle policy and approximately the same creation time, internal chunk fragmentation may be minimized or eliminated. This allows achieving 100% capacity use efficiency at a high storage tier.

Figure 6:
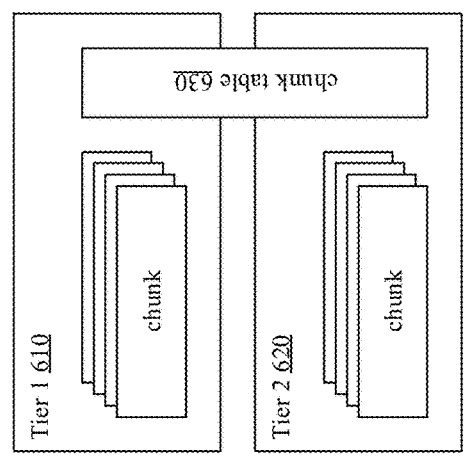
FIG. 6 is a block diagram illustrating an example tiered storage system.

Referring to FIG. 6, a block diagram illustrating an example tiered storage system 600 is shown. From storage tiering perspective the storage system 600 contains chunks and these chunks can be moved between different tiers (e.g., Tier 1 610 and Tier 2 620). A global chunk table 630 that associates chunks as identified by their identifiers (IDs) with their locations may be used. With the chunk table 630, chunks may be promoted or demoted in their entirety between the tiers while their IDs are preserved. Accordingly, data object location information, which associates data objects with chunk IDs, need not be updated when data objects are promoted or demoted. Consequently, tiering overhead may also be reduced.

Figure 7:
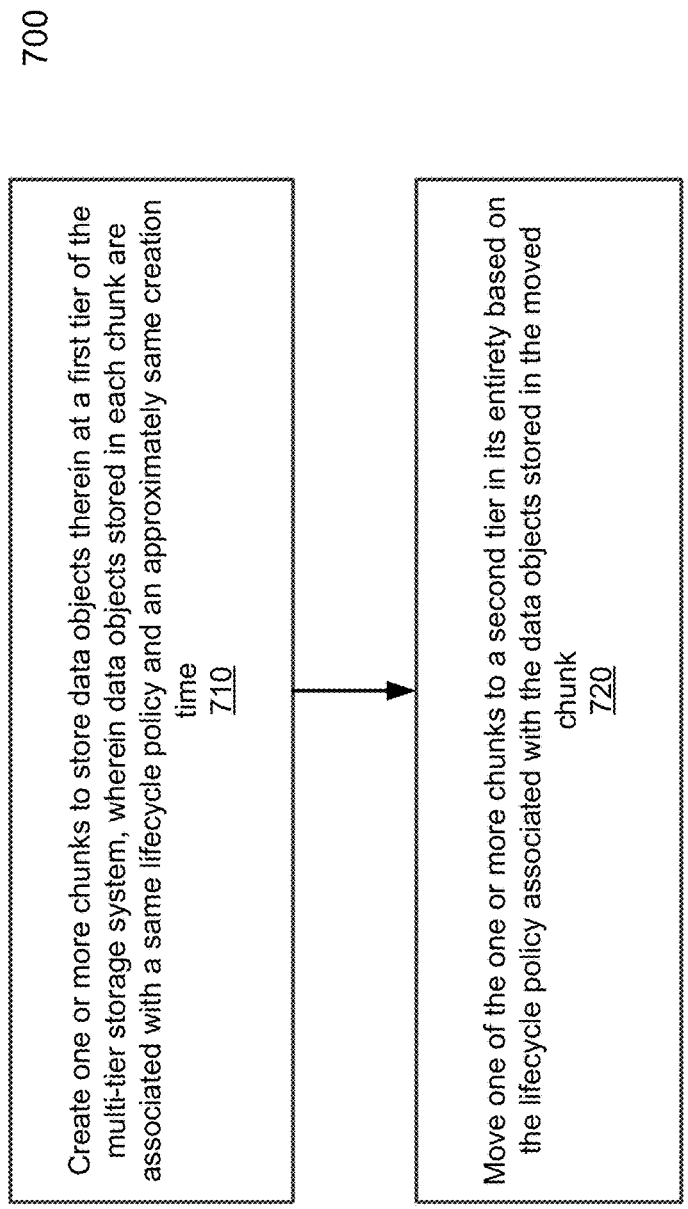
FIG. 7 is a flowchart illustrating an example method for promoting or demoting data objects in a multi-tier storage system.

Referring to FIG. 7, a flowchart illustrating an example method 700 for promoting or demoting data objects in a multi-tier storage system is shown. At block 710, one or more chunks to store data objects therein may be created at a first tier of the multi-tier storage system, wherein data objects stored in each chunk are associated with a same lifecycle policy and an approximately same creation time. At block 720, one of the one or more chunks may be moved to a second tier in its entirety based on the lifecycle policy associated with the data objects stored in the moved chunk.

In method 700, the second tier may be either a lower tier or a higher tier than the first tier. The lifecycle policy associated with the data object may specify a time period for which the data objects are to be stored at the first tier before being moved to the second tier.

Further, the multi-tier storage system may comprise a chunk table that associates chunks with their locations in the multi-tier storage system. Moving the chunk to the second tier may comprise updating the chunk table. In addition, data object location information that associates the data objects stored in the chunk with the chunk may not be changed when the chunk is moved to the second tier.

Method 700 may be performed by processing logic that includes hardware (e.g. circuitry, dedicated logic, etc.), software (e.g., embodied on a non-transitory computer readable medium), or a combination thereof. For example, method 700 may be performed by processors 1501 of FIG. 8. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, according to the embodiments of the disclosure herein, data objects associated with approximately the same creation time and the same lifecycle policy may be stored in a same chunk. Such chunks may be promoted or demoted between storage tiers of a multi-tier storage system in their entirety. As a result, internal chunk fragmentation may be reduced or eliminated, improving capacity use efficiency, especially at higher storage tiers. Overhead associated with data promotion or demotion may also be reduced. By storing data objects associated with approximately the same creation time and the same lifecycle in a same chunk, storage of data objects at a higher tier than necessary may also be avoided.

Figure 8:
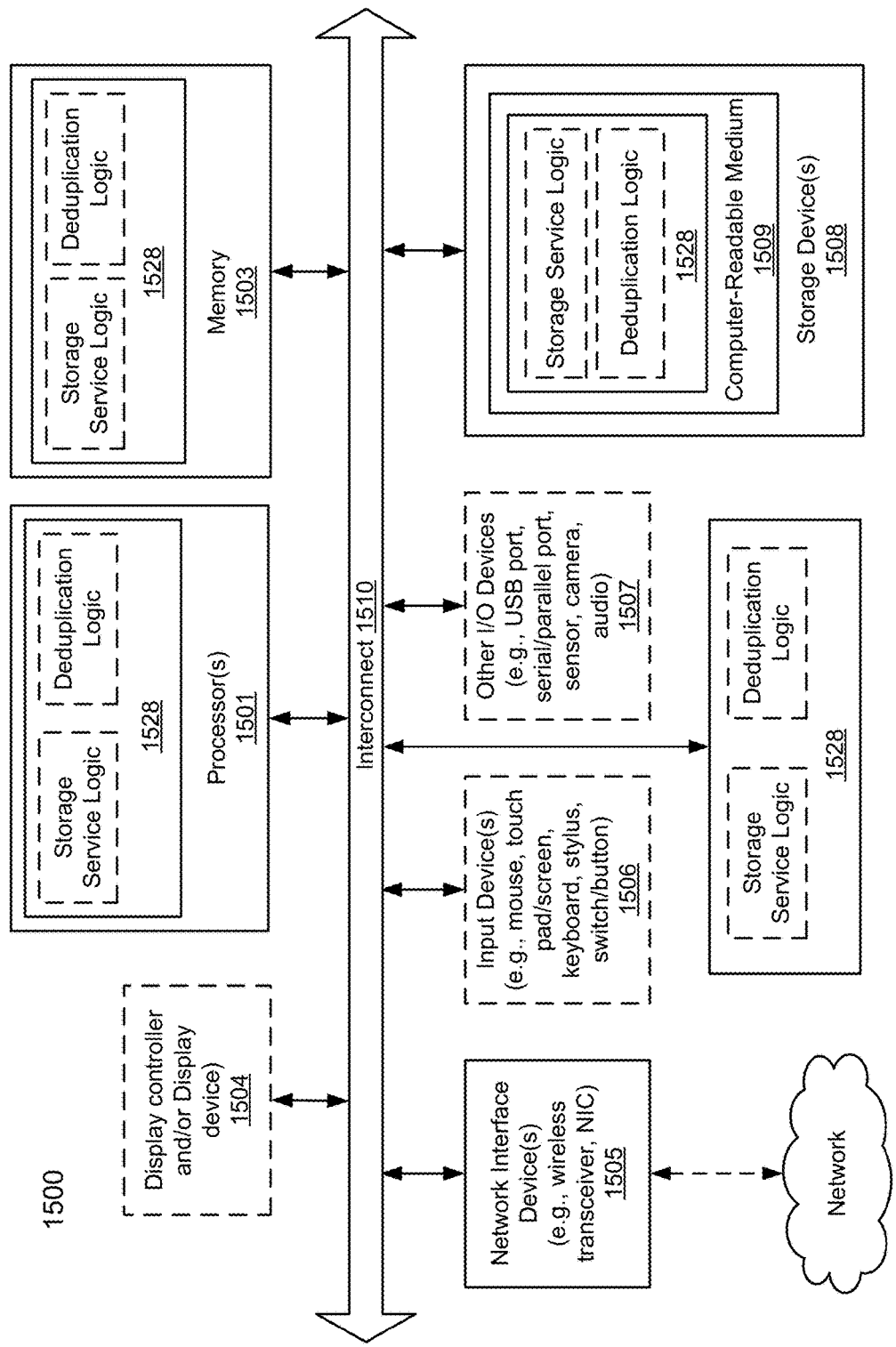
FIG. 8 is a block diagram illustrating an example of a data processing system which may be used with one embodiment of the disclosure.

FIG. 8 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the disclosure.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for promoting or demoting data objects in a multi-tier storage system, comprising:
    creating one or more chunks to store a plurality of data objects in the one or more chunks at a first tier of the multi-tier storage system, wherein each of the one or more chunks is a block of storage space of a fixed size in the multi-tier storage system, and wherein all data objects stored in each chunk are associated with a same lifecycle policy and an approximately same creation time; and
    moving one of the one or more chunks to a second tier in its entirety based on the lifecycle policy associated with the data objects stored in the moved chunk, wherein the multi-tier storage system comprises a chunk table that associates chunks with their locations in the multi-tier storage system, wherein moving the chunk of the plurality of data objects to the second tier comprises updating the chunk table to reflect moving the moved chunk to the second tier.

2. The method of claim 1, wherein the second tier is a lower tier than the first tier.

3. The method of claim 1, wherein the second tier is a higher tier than the first tier.

4. The method of claim 1, wherein the multi-tier storage system comprises three or more tiers.

5. The method of claim 1, wherein the lifecycle policy associated with the data object specifies a time period for which the data objects are to be stored at the first tier before being moved to the second tier.

6. The method of claim 1, wherein data object location information that associates the data objects stored in the moved with the moved chunk is not changed when the moved chunk is moved to the second tier.

7. A non-transitory machine-readable medium having instructions stored therein which, when executed by a processor, cause the processor to perform storage operations, the storage operations comprising:
    creating one or more chunks to store a plurality of data objects in the one or more chunks at a first tier of a multi-tier storage system, wherein each of the one or more chunks is a block of storage space of a fixed size in the multi-tier storage system, and wherein all data objects stored in each chunk are associated with a same lifecycle policy and an approximately same creation time; and
    moving one of the one or more chunks to a second tier in its entirety based on the lifecycle policy associated with the data objects stored in the moved chunk, wherein the multi-tier storage system comprises a chunk table that associates chunks with their locations in the multi-tier storage system, wherein moving the chunk of the plurality of data objects to the second tier comprises updating the chunk table to reflect moving the moved chunk to the second tier.

8. The non-transitory machine-readable medium of claim 7, wherein the second tier is a lower tier than the first tier.

9. The non-transitory machine-readable medium of claim 7, wherein the second tier is a higher tier than the first tier.

10. The non-transitory machine-readable medium of claim 7, wherein the multi-tier storage system comprises three or more tiers.

11. The non-transitory machine-readable medium of claim 7, wherein the lifecycle policy associated with the data object specifies a time period for which the data objects are to be stored at the first tier before being moved to the second tier.

12. The non-transitory machine-readable medium of claim 7, wherein data object location information that associates the data objects stored in the moved chunk with the moved chunk is not changed when the moved chunk is moved to the second tier.

13. A data processing system, comprising:
    a processor; and
    a memory coupled to the processor storing instructions which, when executed by the processor, cause the processor to perform storage operations, the storage operations including
    creating one or more chunks to store a plurality of data objects in the one or more chunks at a first tier of a multi-tier storage system, wherein each of the one or more chunks is a block of storage space of a fixed size in the multi-tier storage system, and wherein all data objects stored in each chunk are associated with a same lifecycle policy and an approximately same creation time; and
    moving one of the one or more chunks to a second tier in its entirety based on the lifecycle policy associated with the data objects stored in the moved chunk, wherein the multi-tier storage system comprises a chunk table that associates chunks with their locations in the multi-tier storage system, wherein moving the chunk of the plurality of data objects to the second tier comprises updating the chunk table to reflect moving the moved chunk to the second tier.

14. The data processing system of claim 13, wherein the second tier is a lower tier than the first tier.

15. The data processing system of claim 13, wherein the second tier is a higher tier than the first tier.

16. The data processing system of claim 13, wherein the multi-tier storage system comprises three or more tiers.

17. The data processing system of claim 13, wherein the lifecycle policy associated with the data object specifies a time period for which the data objects are to be stored at the first tier before being moved to the second tier.

18. The data processing system of claim 13, wherein data object location information that associates the data objects stored in the moved chunk with the moved chunk is not changed when the moved chunk is moved to the second tier.

* * * * *